United States Patent [19]

Abe et al.

[11] Patent Number: 4,499,964

[45] Date of Patent: Feb. 19, 1985

[54] POWER STEERING SYSTEM

[75] Inventors: Michio Abe; Naoyuki Maeda, both of Aichi, Japan

[73] Assignee: Tokai TRW & Co. Ltd., Aichi, Japan

[21] Appl. No.: 382,362

[22] Filed: May 26, 1982

Related U.S. Application Data

[63] Continuation-in-part of Ser. No. 221,612, Dec. 31, 1980, Pat. No. 4,392,540, and a continuation-in-part of Ser. 284,539, Jul. 20, 1981, Pat. No. 4,417,640.

[30] Foreign Application Priority Data

May 29, 1981 [JP] Japan .................... 56-82346

[51] Int. Cl.³ .............................. B62D 5/06
[52] U.S. Cl. ..................... 180/142; 180/148
[58] Field of Search .......... 180/143, 142, 141, 148, 180/132; 60/431

[56] References Cited

U.S. PATENT DOCUMENTS

| 3,011,579 | 12/1961 | Milliken, Jr. et al. | 180/132 |
| 3,580,352 | 5/1971 | Hestad et al. | 180/132 |
| 3,983,953 | 10/1976 | Bayle | 180/79.1 |
| 3,991,846 | 11/1976 | Chichester et al. | 180/132 |
| 4,008,779 | 2/1977 | Shinoda et al. | 180/79.1 |
| 4,056,160 | 11/1977 | Abels et al. | 180/143 |

FOREIGN PATENT DOCUMENTS

| 44733 | 7/1981 | European Pat. Off. | |
| 2255602 | 5/1974 | Fed. Rep. of Germany | 180/143 |
| 2401950 | 7/1974 | Fed. Rep. of Germany | |
| 2508938 | 9/1976 | Fed. Rep. of Germany | |
| 2836926 | 3/1980 | Fed. Rep. of Germany | 180/143 |
| 2915890 | 11/1980 | Fed. Rep. of Germany | |
| 56-99859 | 8/1981 | Japan | 180/143 |
| 1400634 | 1/1973 | United Kingdom | |
| 2401950 | 7/1974 | United Kingdom | |
| 1499273 | 1/1978 | United Kingdom | |
| 2079691 | 1/1982 | United Kingdom | |
| 2086323 | 5/1982 | United Kingdom | 180/142 |

Primary Examiner—John A. Pekar
Attorney, Agent, or Firm—Yount & Tarolli

[57] ABSTRACT

An electric-oil pressure power steering system for a vehicle is described which comprises an oil pump driven by an electric motor for supplying power fluid to a power cylinder, a steering wheel connected to a control valve for controlling the supply of the power fluid, and an electronic switching device for controlling the supply of electric power to said motor in response to the change of a vehicle speed, said electronic switching device including a means for controlling continuously the supply of the electric power and a means for controlling discontinuously or variably the supply of the electric power.

8 Claims, 6 Drawing Figures

POWER STEERING SYSTEM

RELATED APPLICATIONS

This application is a continuation-in-part of application Ser. No. 221,612, filed Dec. 31, 1980 by Michio Abe and Naoyuki Maeda and entitled "Power Steering Device for a Vehicle", now U.S. Pat. No. 4,392,540 and of application Ser. No. 284,539, filed July 20, 1981 by Michio Abe and Naoyuki Maeda for "Electrically Driven Oil Pressure Power Steering Apparatus", now U.S. Pat. No. 4,417,640. The benefit of the filing data of the earlier filed application is claimed for this application under the provisions of 35 USC 120.

BACKGROUND OF THE INVENTION

This invention relates to an electric-oil pressure power steering system, and more particularly to an electric-oil pressure power steering system using an electronic switching means comprising a relay device having a smaller resistance loss in circuit and a semiconductor switching element of a smaller capacity, in which an output of an oil pump driven by an electric motor may change to be congruous with a vehicle speed at the only time of steering.

In general, larger steering power is required to operate a steering wheel of a vehicle at a stepping state or a lower speed state of the vehicle so as to park the vehicle and put it into a garage, and it is now widespread to provide a power steering system for a small-sized vehicle as well as a large-sized vehicle to thereby assist such larger steering power.

Such power steering system may be classified by the kinds of power source thereof into, for example, an oil-pressure type, an air-pressure type, an electric type and so on, and is constructed so that, as a component of the system, an oil pump for generating oil pressure as a power source of the power steering system is generally employed, the change of steering torque is mechanically detected to operate a control valve for controlling the oil pressure to a power cylinder, and the oil pressure energized by the operation of the control valve facilitates the movement of the power cylinder to reduce the steering power to be required by the steering wheel.

In the power steering system, it is important to set up suitable steering power and it is desirable that when the vehicle is running at a lower speed, the supply of power fluid which assists the rotation of the steering wheel is increased to thereby allow the steering wheel to rotate lightly and when the vehicle is running at a higher speed, the supply of the power fluid is reduced to thereby cause the steering wheel to rotate heavily so as to stabilize the steering wheel. In a conventional power steering system, an oil pump is rotated by means of belt driving from an engine shaft of an automobile to cause the oil pressure to assist steering and, therefore, there are the disadvantages that steering assistant force is applied in excess at a high speed and driving power is extremely consumed. Accordingly, it has been expected to develop a novel power steering system of an energy saving type. An electric-oil pressure power steering system of this invention can meet the needs of the times and overcome the technical problems above.

In any case, it is necessary to reduce the supply of the power fluid to cause the steering wheel to rotate heavily at a normal or high speed running state, thereby preventing steering torque from decreasing in excess, and to increase the supply of the power fluid to obtain sufficient steering torque when larger steering torque at, for example, a lower speed or stopping state, is required.

SUMMARY OF THE INVENTION

The present invention provides an electric-oil pressure power steering system which can overcome the above-mentioned disadvantages.

According to the present invention, an electric motor for driving an oil pump is connected to a power source through an electronic switching device which comprises a coil for actuating a relay contact and a switching element, said relay contact connecting continuously between said motor and said power source and said switching element connecting discontinuously or variably therebetween. Furthermore, a speed sensor and a driving sensor are provided to control the electronic switching device.

In the operation of the electric-oil pressure power steering system, when an alternator is operated after the starting of an engine, the motor is continuously connected to the power source through the relay contact in the electronic switching device and rotates at a rated speed until the running speed of the vehicle reaches a first predetermined value. That is, in the extent between the stopping state and the predetermined lower speed value, the whole amount of the power fluid is continuously discharged from the oil pump to accomplish the desired powering. Next, the switching element in the electronic switching device connects discontinuously or variably the motor to the power source to reduce the rotation of the motor in response to the increase of the vehicle speed to thereby control the amount of the power fluid discharged from the oil pump under a variable mode until the running speed of the vehicle reaches a second predetermined value, a higher speed value, after the exceeding of the first predetermined value. Under such variable mode control, unlike the fixed mode control under the rated rotation of the motor, the powering at the steering can be accomplished in response to the running speed of the vehicle. Finally, when the running speed of the vehicle exceeds the second predetermined value, the motor is stopped to extinguish the oil pressure from the oil pump and, at the same time, both chambers of a power cylinder are by-passed by means of a by-pass valve to change from the power steering state to a manual steering state.

It is, therefore, an object of the present invention to provide an electric-oil pressure power steering system in which the output of the oil pump driven by the motor can be controlled by using the electronic switching device, the speed sensor responsible to the vehicle speed and the driving sensor.

Another object of the present invention is to provide the electric-oil pressure power steering system in which the output of the oil pump can be repeatedly controlled under the variable mode or the fixed mode or can be reversibly controlled therebetween.

Another object of the present invention is to provide the electric-oil pressure power steering system which can be changed from the power steering state to the manual steering state when the vehicle speed exceeds a predetermined value and the variable mode control is disused.

Still another object of the present invention is to provide the electric-oil pressure power steering system in which the power fluid in both chambers of a power cylinder can be communicated after changing to the manual steering state.

These and other objects and advantages of the present invention will be apparent more clearly from the following detailed disclosure read in conjunction with the accompanying drawings.

DESCRIPTION OF THE PREFERRED EMBODIMENT

Figure 1:
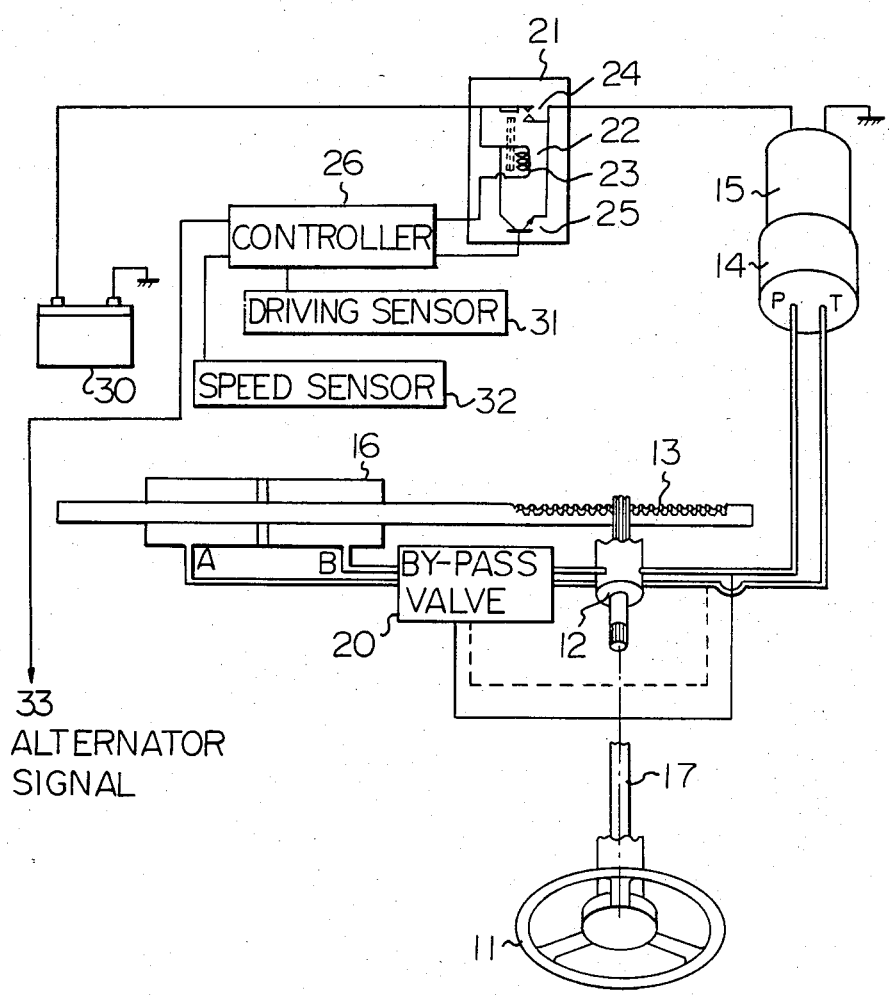
FIG. 1 is a diagrammatic view of a preferred embodiment of the electric-oil pressure power steering system of the present invention.

In FIG. 1, a steering wheel 11 is operatively coupled through a handle shaft 17 to a control valve 12 which acts as a servo valve. An input side of the control valve 12 is connected to both a supply port P and a return port T of an oil pump 14 and output side ports A and B of the control valve 12 are connected through a by-pass valve 20 to one of chambers of an oil pressure circuit in a power cylinder 16 which acts as an actuator. The power fluid in the oil pump 14 is applied to one of the chambers of the power cylinder 16 which, in response to the pressure from the port P of the oil pump, is operated to move an actuator rod of the power cylinder in any of left and right directions. The back pressure of the power cylinder is applied to the return port T of the oil pump 14 through the control valve 12. An output of the power cylinder is transmitted to left and right wheels (not shown) of the vehicle at both ends of a rack gear 13 and transmitted to the steering wheel 11 through a pinion gear and the handle shaft 17 to assist a steering operation.

One terminal of an electric motor 15 for driving the oil pump 14 is electrically connected to one terminal of a battery 30 through an electronic switching device 21 comprising a relay 22 and a transistor 25, and the other terminals of the battery 30 and the motor 15 are connected to the ground. The relay 22 comprises a coil 23 and a contact 24 which is closed by energizing the coil 23, one terminal of the coil 23 is connected to said one terminal of the battery 30, and the other terminal of the coil 23 is connected to a controller 26 in which a preset vehicle speed signal compared with a signal from a speed sensor 32 may be controlled by a signal from a driving sensor 31 (ON-OFF control). One terminal of the contact 24 is connected to said one terminal of the battery 30 and the other terminal of the contact 24 is connected to said one terminal of the motor 15. A collector of the transistor 25 is connected to said one terminal of the battery 30, an emitter of the transistor is connected to said one terminal of the motor 15 and a base of the transistor is connected to the controller 26 in which a pulse signal may be shaped from both a switching control signal responding to the vehicle speed and the signal from the driving sensor 31, said pulse signal being applied to the base of the transistor. The contact 24 and the transistor 25 are connected to said one terminal of the battery 30 and said one terminal of the motor, respectively, in parallel and are selectively controlled by respective means associated therewith.

The signal from the driving sensor 31 acts on the controller 26 when the completion of operation of an alternator is detected after the starting of an engine, and the speed sensor 32 controls the controller in response to the vehicle speed so as to instruct an ON-OFF state of the relay 22, a conductive state of the transistor 25 and a rotating speed of the motor 15. That is, in accordance with the instructions of the driving sensor 31 and the speed sensor 32, the motor 15 can be operated in any of a Relay-ON Area, a Transistor Switching Area and a Motor-OFF Area, as described below.

It is desirable that an engine key signal or an alternator signal 33 is applied to, for example, an AND gate in the controller to protect the battery 30 at the starting of the engine and the signal is also applied to the controller through a delay circuit so that the controller functions with a slight delay after the starting and stopping of the engine.

Figure 2:
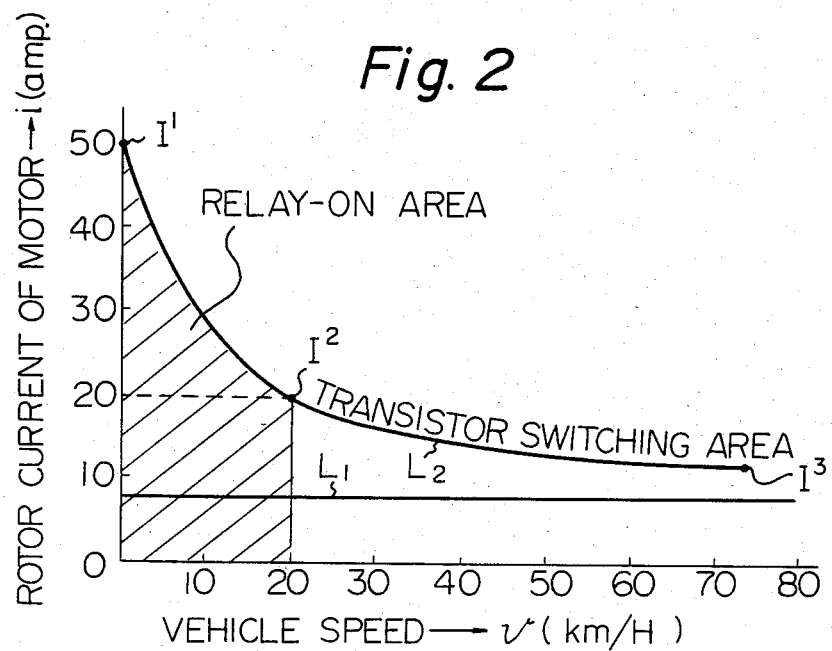
FIG. 2 shows a running characteristic of the preferred embodiment as shown in FIG. 1 and, in particular, a relationship between the vehicle speed and the rotor current of the motor.
Figure 3:
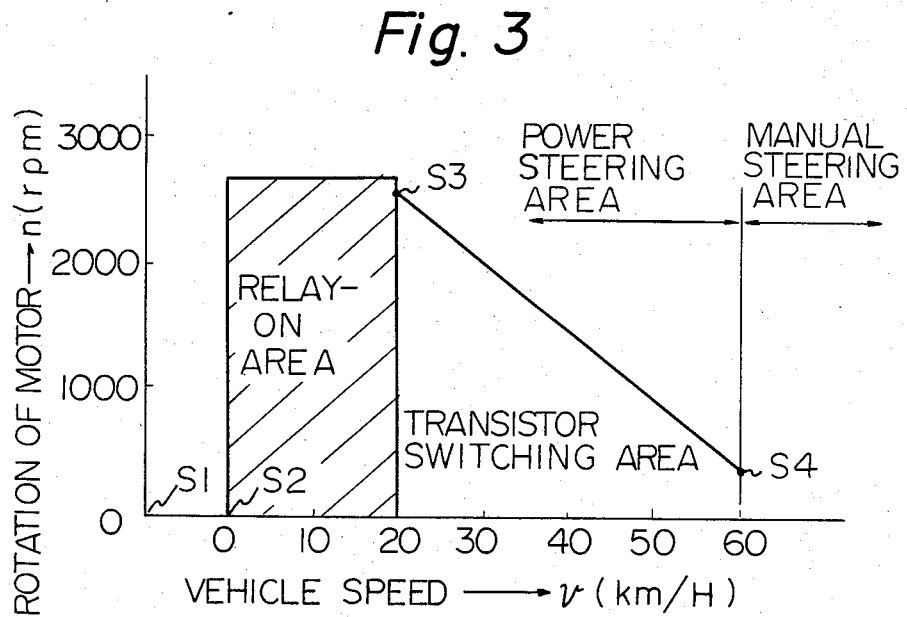
FIG. 3 shows a running characteristic of the preferred embodiment as shown in FIG. 1 and, in particular, a relationship between the vehicle speed and the number of rotation of the motor.
Figure 4:
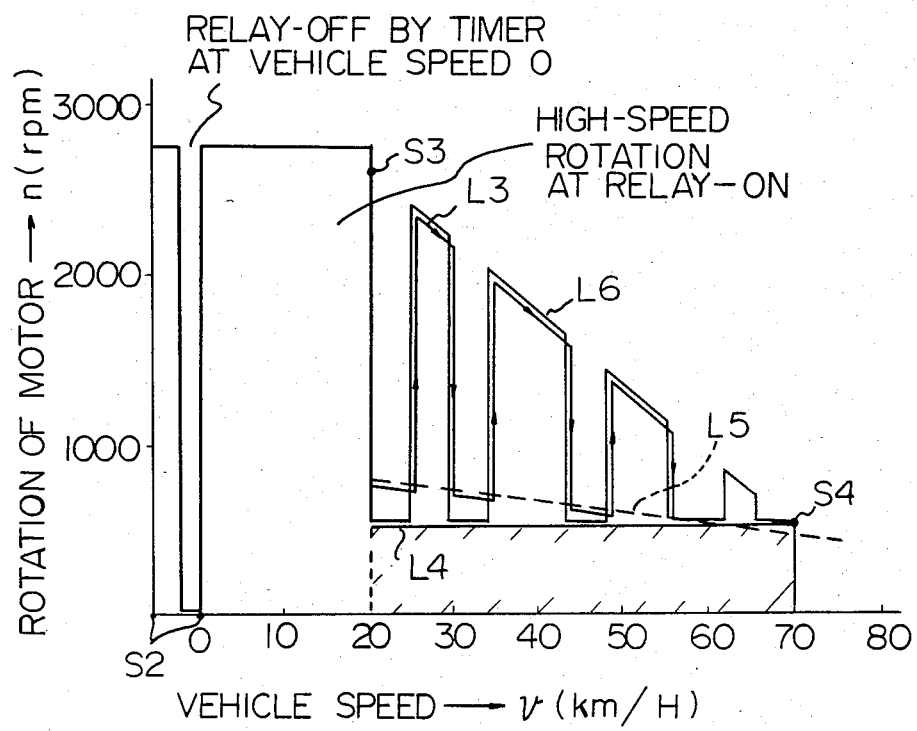
FIG. 4 shows a running characteristic of the preferred embodiment as shown in FIG. 1 and, in particular, a relationship between the vehicle speed and the number of rotation of the motor at a non-steering and steering states.

Referring now to FIGS. 2 through 4, a running characteristic of the vehicle using the electric-oil pressure power steering system as shown in FIG. 1 will be explained. In the drawings, the X axes give the vehicle speeds, while the Y axes give the rotor current of the motor in FIG. 2 and the number of rotation of the motor in FIGS. 3 and 4, respectively. Also, S1 denotes the engine key or alternator signal, S2 denotes a driving sensor signal for closing the relay and S3 denotes an electric power supply switching signal.

When the engine key or alternator signal exists on the signal line, the operation of the controller 26 is started by the signal S1 after the engine starts and the output voltage of the alternator goes up, for example, after the delay of 1-2 seconds. Next, when the electric power is applied in response to the driving sensor signal, the coil 23 in the electronic switching device 21 is energized to close the contact 24, thereby outputting a rotor current i to rotate the motor. In such continuous mode area, it is desirable that the driving sensor detects a driving signal as generated by any of the operation of a transmission, a brake pedal, a clutch pedal, an accelerator pedal, etc. Concretely, the rotor current of the motor 15 is given as a non-steering current curve L1 in FIG. 2 at the non-steering state and is maintained at a fixed current value such as 8 (amp.).

It is well known that a larger steering load is required at a vehicle speed 0 or a lower vehicle speed. In such steering state, it is desirable to increase the power fluid applied from the oil pump 14 to power the steering wheel 11 in answer to the larger steering load. In such steering state, the power fluid which is applied by the operation of the steering wheel 11 from the supply port P of the oil pump 14 to the control valve 12 is applied through the valve to one of the chambers of the power cylinder 16 to move the piston rod of the cylinder in any direction. This movement is transmitted to the steering wheel 11 through the rack pinion gear 13 to power the steering of an operator. After the completion of steering, the back pressure of the power fluid is returned from the other chamber to the return port T of the oil pump 14 through the control valve 12. In this steering state, in accordance with the degree of pressure of the power cylinder 16 proportional to the amount of operation of the steering wheel 11, the rotor current i increases immediately to satisfy the amount of power fluid to be required by the oil pump 14 and then decreases from a point $I^1$ to a point $I^2$ along the steering current curve L2 as shown in FIG. 2. That is, it is shown in FIG. 2 that the rotor current i decreases from about 50 (amp.) to about 20 (amp.) at the stopping state or the lower vehicle speed, or in the steering state within the extent between 0 (km/H) and about 20 (km/H) of the vehicle speed (Relay-ON Area). This means that, until the vehicle speed reaches about 20 (km/H), the full voltage of the battery 30 is applied to the motor 15 through the contact 24 of the relay 22 and the motor receives the full-load current so that the amount of power fluid required at the stop or lower speed steering can be discharged from the apply port P of the oil pump 14.

Next, until the vehicle speed reaches about 60 (km/H) after the exceeding of about 20 (km/H)(Transistor Switching Area), the controller 26 generates a pulse signal having the duration responsible to the vehicle speed, the duration decreasing in answer to the increase in the vehicle speed, in response to the electric power switching signal S3 formed by monitoring the signal from the speed sensor 32 only at the steering, that is, when the driving sensor detects, for example, the steering angle displacement or the steering torque of the steering wheel 11. The pulse signal from the controller 26 is applied to the base of the transistor 25 to change the conductive state thereof. Thus, the ON-OFF time period of the transistor 25 is changed to control the current input to the motor in accordance with the change of parameter relative to three terminals of the transistor 25 so that the motor output for driving the oil pump is controlled. Instead of such transistor as a switching element, it may be possible to use a silicon controlled rectifier and the like having a gate for controlling the ON-OFF time period by applying a voltage signal thereto. It is optimum to use, for example, 50–1000 (Hz) as switching frequencies. By controlling the conductive time of such switching element, the variable mode control is accomplished and, therefore, the electric power can be discontinuously or variably applied to the motor coupled to the oil pump. Also, in such variable mode, the motor may be continuously rotated at the non-steering of the steering wheel, without using a driving sensor, although such construction is not shown.

In the Transistor Switching Area, the rotor current i decreases from the point $I^2$ to the point $I^3$ along the steering current curve L2, as shown in FIG. 2. That is, in FIG. 2, the rotor current i in the Transistor Switching Area decreases from about 20 (amp.) to about 15 (amp.) and the rate of this decrease is considerably small in comparison with that of the decrease of the rotor current from about 50 (amp.) to about 20 (amp.) in the Relay-ON Area. This means that the steering power to be applied to the steering wheel 11 can be reduced in answer to the increase of the vehicle speed, that is, the stroke in the power cylinder 16 and the amount of power fluid to be discharged from the oil pump 14 can be reduced.

On the other hand, as shown in FIGS. 3 and 4, after the starting of the alternator is detected by the signal 33 at the point S1, the number of rotation n of the motor 15 is maintained at an approximately fixed value, 2700 (rpm), from the point S2 when the electronic switching device 21 is operated by the operation of the driving sensor 31 to energize the motor 15, that is, in the Relay-ON Area, and then decreases from the point S3, about 2600 (rpm), to the point S4, about 400 (rpm), in the Transistor Switching Area. This means that it is mainly influenced only by the increase of the vehicle speed that the rotor current i as shown in FIG. 2 decreases rapidly in the Relay-ON Area and decreases gently in the Transistor Switching Area, and the number of rotation n as shown in FIG. 3 is maintained at an approximately fixed value in the Relay-ON Area and decreases at a fixed rate in the Transistor Switching Area. That is, both the rotor current and the number of rotation decrease to such degree that the power steering is disused at the larger vehicle speed in the Transistor Switching Area, and the power steering state can be changed to the manual steering state at the points $I^3$ and S4.

Thus, after the rotor current i decreases to the point $I^3$ along the steering current curve L2 or the number of rotation n decreases to the point S4 at a fixed rate, the power supply from the battery 30 to the motor 15 is interrupted by the operation of a speed comparator in the controller 26 which has a preset signal to be compared with the speed signal, whereby the power steering state can be changed to the manual steering state in which only the steering force by the steering wheel 11 acts. Inversely, when the number of rotation n returns to the point S4 the switching operation of the transistor is started, and when the number of rotation changes to return from the point S4 to the point S3 and then reaches the point S3 the relay 22 is actuated again, thereby applying the electric power to the motor.

When the steering wheel is operated and the number of rotation n is changed from the point S3 to the point S4 or from S4 to S3 in the Transistor Switching Area in response to the change of the vehicle speed, the vehicle speed responsible rotation curve L3 in FIG. 4 is given between the vehicle speed responsible base rotation curve L5 at the non-steering and the rotation curve L6 at the steering, as a change in one direction as shown by an arrow or the opposite direction, the curve L5 being given on the basis of the fixed base rotation curve L4 at the non-steering during the signal from the speed sensor 32 is used, and the curve L4 being given at the non-steering during the signal from the speed sensor 32 is not used. As shown by the curves L5 and L6, in the extremely low speed state, the number of rotation n of the motor in response to the vehicle speed signal is greatly increased from the curve L5 at the non-steering to the curve L6 when the steering wheel is operated and the power fluid discharged from the oil pump 14 is accordingly increased. On the other hand, the number of rotation is slightly increased in the higher speed state so that the amount of power fluid to be required is satisfied. This means that the rising response of the rotation of the motor is improved by using the auxiliary base rotation at the stop steering or the extremely low speed steering.

As described above, when the number of rotation n reaches the point S4 in FIGS. 3 and 4 and the switching to the manual steering state is accomplished, the by-pass valve 20 is operated in response to the ON-OFF state of the motor in accordance with the instructions from the speed sensor 32. By the operation of the by-pass valve, the port A of the oil pump 14 is communicated with the port B thereof and then the electric power supplied to the motor 15 is interrupted to stop the operation of the oil pump 14. At such switching to the manual steering state, the communication of the power fluid by the by-pass valve is efficiently controlled between the chambers of the power cylinder. In the preferred embodiment, the resistance of the power fluid in the manual steering state is reduced by by-passing the both chambers of the cylinder at the power OFF and, however, the present invention can be easily effected without using the by-pass valve.

As described above, according to the construction of the present invention, in order to control the amount of power fluid to be required by the steering torque, the electric power can be continuously applied through the relay in the area where the increase of the steering torque and, therefore, the increase of the control current of the motor is required at the vehicle running speed 0 or in the extremely low speed state, and the electric power can be discontinuously or variably applied by the ON-OFF operation of the transistor switching element having a small capacity in the intermediate speed area where the steering torque is reduced and the motor load current becomes small. Additionally, when the running speed of the vehicle reaches the higher speed state, since there is no necessity to power the steering torque, it is possible to interrupt the switching supply of the electric power and, if desired, to communicate the both chambers of the power cylinder by the operation of the by-pass valve so that the power steering state can be switched to the manual steering state.

In FIGS. 1 to 4, the preferred embodiment is constructed so that the relay and the transistor of the electronic switching device are alternatively operated to supply the electric power to the motor on the basis of the vehicle speed detected by the speed sensor, that is, by means of the speed comparator in the controller, the electric power is applied through the relay in the lower vehicle speed area (0-20 km/H in FIG. 3), is applied through the transistor under the variable mode in the intermediate speed area (20-60 km/H), and is interrupted in the higher vehicle speed area (above 60 km/H).

Figure 5:
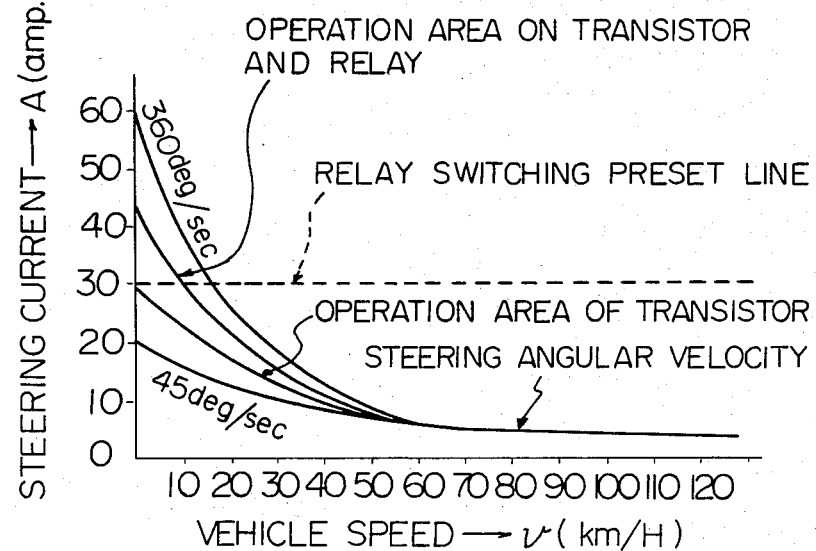
FIG. 5 shows a running characteristic of the preferred embodiment as shown in FIG. 1 and, in particular, a relationship between the steering current and the vehicle speed.
Figure 6:
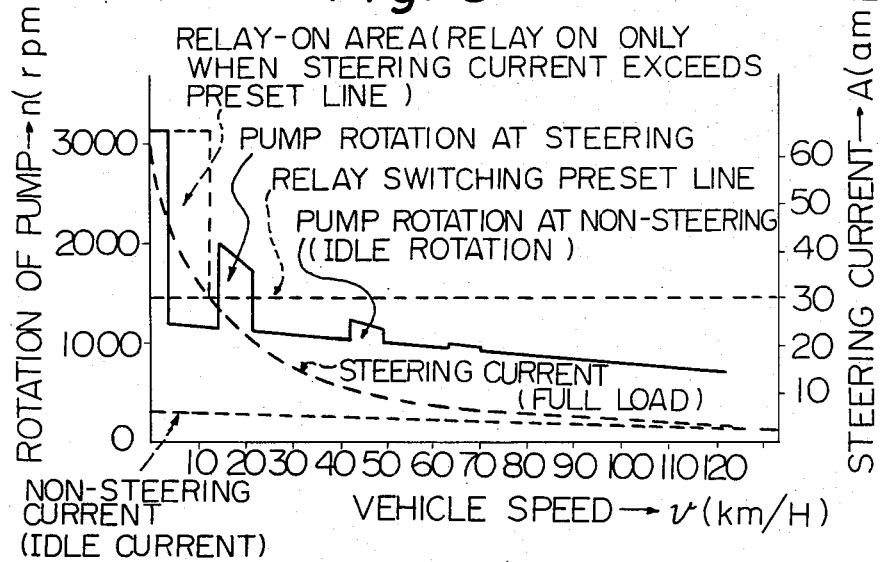
FIG. 6 shows a running characteristic of the preferred embodiment as shown in FIG. 1 and, in particular, a relationship between the steering current or the number of rotation of the oil pump and the vehicle speed at a non-steering and steering states.

On the other hand, it may be possible to control the electronic switching device on the basis of the steering current, instead of the vehicle speed. In the concrete, such system may be constructed so that the steering current as obtained from the driving sensor, such as a steering torque sensor, is applied to a steering current comparator in the controller to compare the detected steering level with the relay switching preset level and, in response to the result of comparison, the relay and the transistor of the electronic switching device are alternatively operated to supply the electric power to the motor, or, as shown in FIGS. 5 and 6, the relay and the transistor are simultaneously operated in parallel to supply the electric power to the motor only when under the regular operation of the transistor the steering current level exceeds the relay switching preset level, that is, is within the heavier load area. In particular, according to the latter, it is possible that the output of the oil pump is responsible to the vehicle speed throughout the whole by the switching operation of the transistor, except the operating period of the relay at the steering in excess.

As explained above, the features of the present invention lie in that the electric power supplied to the oil pump for discharging the power fluid can be varied in response to the vehicle speed which is sectioned into three stages, that is, the lower speed area, the intermediate speed area and the higher speed area, the contact relay of the lower cost and having the smaller resistance loss in the conductive state is used to supply the electric power in the lower speed area where the larger steering torque is required and the current of the motor becomes large, and the semiconductor element, that is, the transistor having a smaller capacity is used to vary the supply of the electric power in response to the vehicle speed in the intermediate speed area where the steering torque and the load current of the motor are reduced, whereby the miniaturization and the lightening in weight of the electronic switching device can be accomplished.

Additionally, according to the electric-oil pressure power steering system of the present invention, the oil pump is stopped to switch from the power steering state to the manual steering state in the higher speed area where the steering torque is not required, whereby the saving of the steering power and the stabilization in the high speed running can be expected.

What is claimed is:

1. An apparatus for use in operating a power steering motor and turning a steerable vehicle wheel, said apparatus comprising a pump, electric motor means for driving said pump to supply fluid to the power steering motor, and control means for varying the speed of operation of said electric motor means through a range of operating speeds, said control means including circuit means operable between a nonconducting state and a conducting state wherein electrical energy is supplied to said motor means and means responsive to vehicle speed for decreasing the speed of operation of said motor means through the range of operating speeds as vehicle speed increases by switching said circuit means between the conducting and nonconducting states to maintain said circuit means in the conducting state a percentage of the time which decreases through the range of motor operating speeds as vehicle speed increases during a steering operation.

2. An apparatus as set forth in claim 1 wherein said control means further includes means for conducting a continuous flow of electrical energy to said motor means during a steering operation when the vehicle is traveling at speeds less than a predetermined speed.

3. An apparatus as set forth in claim 1 wherein said means for switching said circuit means includes means for generating constant voltage electrical pulses having a pulse width which varies as a function of vehicle speed.

4. An apparatus as set forth in claim 1 wherein said means for swithcing said circuit means includes means for maintaining said circuit means in a nonconducting state at vehicle speeds above a predetermined vehicle speed.

5. An apparatus for use in operating a power steering motor and turning a steerable vehicle wheel, said apparatus comprising a pump, electric motor means for driving said pump to supply fluid to the power steering motor, and control means for controlling operation of said electric motor means, said control means including circuit means operable between a nonconducting state and a conducting state conducting electrical energy to said motor means and means for repetitively switching said circuit means between the conducting and nonconducting states to maintain said circuit means in the conducint state a first percentage of the time during a steering operation at a first vehicle speed and for repetitively switching said circuit means between the conducting and nonconducting states to maintain said circuit means in the conducting state a second percentage of the time which is smaller than the first percentage of time during a steering operation at a second vehicle speed which is greater than a first vehicle speed.

6. An apparatus as set forth in claim 5 wherein said control means further includes means for decreasing the percentage of time which said circuit means is in the conducting state during a steering operation as vehicle speed increases.

7. An apparatus as set forth in claim 5 wherein said control means further includes means for conducting a continuous flow of electrical energy to said motor means during a steering operation when the vehicle is traveling at speeds less than a predetermined speed.

8. An apparatus as set forth in claim 5 wherein said means for repetitively switching said circuit means includes means for generating pulses having a duration which varies as a function of vehicle speed.

* * * * *